United States Patent
Vaquier et al.

(10) Patent No.: US 12,001,322 B2
(45) Date of Patent: Jun. 4, 2024

(54) CODE LINTING IN DYNAMIC APPLICATION ENVIRONMENTS

(71) Applicant: Microsoft Technology Licensing, LLC, Redmond, WA (US)

(72) Inventors: Michael Shinichiro Vaquier, Seattle, WA (US); Gergely Z. Kota, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 171 days.

(21) Appl. No.: 17/668,220

(22) Filed: Feb. 9, 2022

(65) Prior Publication Data
US 2023/0251958 A1 Aug. 10, 2023

(51) Int. Cl.
*G06F 11/36* (2006.01)
*G06F 8/75* (2018.01)

(52) U.S. Cl.
CPC ........... *G06F 11/3676* (2013.01); *G06F 8/75* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 2008/0256508 A1* | 10/2008 | Jonsson | ............... | G06F 40/18 717/104 |
| 2009/0217303 A1* | 8/2009 | Grechanik | .......... | G06F 11/3414 719/320 |
| 2014/0278294 A1* | 9/2014 | Yeager | ................. | G06F 30/20 703/22 |
| 2015/0106782 A1* | 4/2015 | Tuvian | .................. | G06F 8/76 717/104 |
| 2015/0193405 A1* | 7/2015 | Gensburg | ............ | G06F 11/3692 715/229 |
| 2015/0312375 A1* | 10/2015 | Valey | ................. | G06F 3/0481 709/203 |
| 2015/0379061 A1* | 12/2015 | Paraschivescu | ...... | G06F 16/219 707/695 |
| 2017/0046132 A1 | 2/2017 | Bryan et al. | | |
| 2020/0042588 A1* | 2/2020 | Sagalovskiy | ........... | G06F 8/427 |
| 2020/0285694 A1* | 9/2020 | Nield | .................. | G06F 9/45504 |
| 2021/0109722 A1* | 4/2021 | Ripa | .................. | G06F 3/04847 |

OTHER PUBLICATIONS

"ExcelScript.Workbook Interface", Retrieved from: https://docs.microsoft.com/en-us/javascript/api/office-scripts/excelscript/excelscript.workbook?view=office-scripts, Retrieved on Dec. 29, 2021, 41 Pages.

"International Search Report and Written Opinion Issued in PCT Application No. PCT/US22/048364", dated Feb. 22, 2023, 13 Pages.

* cited by examiner

Primary Examiner — Andrew M. Lyons

(57) ABSTRACT

Systems, methods, and software are disclosed herein that support enhanced code linting. In an implementation, an application hosts a content object that is the subject of one or more scripts for automating tasks. A linter obtains an initial state of the content object from the application and generates a model that reflects the object's state. The linter also performs an analysis of the code statements with respect to the model. The linter may then enable or otherwise cause one or more results of the analysis to be displayed in a user interface to a code editor used for interacting with the scripts.

20 Claims, 19 Drawing Sheets

CODE LINTING IN DYNAMIC APPLICATION ENVIRONMENTS

TECHNICAL FIELD

Aspects of the disclosure are related to the field of computer software applications and, in particular, to code linting tools and associated technology.

BACKGROUND

Code linting refers to a process of analyzing source code to identify patterns that might cause errors or other problems at runtime, while a linter is a software tool that employs such capabilities. Early linters identified compiler optimizations, although more advanced and complete tools were developed over time that identify a variety of problems including syntax errors, adherence to coding standards, and other potential problems. Linters are especially useful with respect to interpreted languages since they lack compilers that could otherwise detect errors.

Linting processes perform a static analysis of source code to identify problems in the code. Indications of the problems can be surfaced in a user interface to the code editor through which a user interacts with the code. Many linters lack the ability to consider aspects external to the code that may impact its performance, such as the state of a dynamic environment where the code is intended to be deployed. Some linting tools do have the ability to consider an external environment, but only to a limited extent. For example, some linters for query languages provide autocomplete suggestions with respect to the rows and columns in a database being queried, but they do not prevent the user from typing a non-existent name in the first place.

The harm caused by an invalid query is relatively inconsequential as the database being queried is unaffected. However, the risks posed by problematic code are greater in more dynamic environments that are subject to frequent changes. For instance, some productivity applications allow scripts to be run against and interact with content elements such as the cells, tables, and worksheets in a spreadsheet. The script could alter the content while running successfully, only to encounter an error later in the code. Even though the script may stop at the error, its earlier changes to the content will persist unless otherwise recognized and reversed. User interactions with content can also cause problems in existing code. For example, a user could easily delete an element in a document that is referenced by a script, causing an error at runtime.

Overview

Technology is disclosed herein that improves the performance of code linting and the user experience with respect to linting. Various implementations described below employ a linting process on one or more computing devices. The process takes into account the state of a content object in an application when analyzing code statements. The linting process may be employed locally with respect to the user experience (e.g., on a user's device), remotely with respect to the user experience (e.g., on a server and/or in the cloud), or distributed between or amongst multiple devices, whether they are local or remote.

In an implementation, a computing device includes one or more processors operatively coupled with one or more computer readable storage media. Program instructions stored on the one or more computer readable storage media, when executed by the one or more processors, direct the computing device carry out various steps with respect to a linting process. For example, the computing device displays, in a user interface to a code editor, code statements in one or more scripts for automating tasks with respect to a content object in an application.

The computing device obtains an initial state of the content object from the application and generates a model that reflects at least the initial state of the content object. The device then performs an analysis of the code statements with respect to the model and displays one or more results of the analysis in the user interface to the code editor. A user may consume the results and can take action to remedy any problems that may be identified in the results. For example, the analysis may identify that an element referenced in the code does not exist in the object. The user can avoid runtime errors by creating the element in the object, fixing the reference in the code, or both.

Various technical effects may be appreciated from the implementations disclosed herein, including the time and resources saved by reducing runtime errors in code. Coding time is reduced by discovering and surfacing errors that otherwise might not be discovered until runtime. In addition, considering the state of a content object when performing a linting analysis reduces the number of errors that would otherwise only be discovered at runtime.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Various implementations are disclosed herein that improve the user experience with respect to code editors in software applications, as well as the performance code linters that run in the context of such applications. In particular, the code linters disclosed herein are capable of taking into account the changes that may occur in a dynamic application environment when analyzing the validity or efficacy of a code statement. The changes considered may be explicit such as actual changes made to a content object since the last iteration of a linter. The changes considered may also be implicit such as those called for by the code statements but not actually carried out until runtime.

In an implementation, an application hosts a content object that is the subject of one or more scripts for automating tasks. A linter obtains an initial state of the content object from the application and generates a model that reflects the object's state. The linter also performs an analysis of the code statements with respect to the model. The linter may then enable or otherwise cause one or more results of the analysis to be displayed in a user interface to a code editor used for interacting with the scripts.

In the same or other implementations, performing the code analysis includes identifying references in the code statements to elements of the content object. The analysis also includes checking the model to determine whether the elements exist in the content object, and for at least a one of the elements determined not to exist in the content object, surfacing an indication of an invalid element in the user interface to the code editor.

Performing the analysis may also include identifying one or more implied changes to the content object indicated by one or more of the statements and updating the model to reflect the one or more implied changes. Examples of implied changes include the addition of a new element to the content object called for by one or more of the statements.

In same or other implementations, the linter may obtain, from the application, information indicative of a new state of the content object resulting from actual changes made to the content object by the application, in response to which the linter refreshes the model to reflect the new state of the content object. Examples of actual changes include the actual addition of a new element to the content object.

Figure 1:
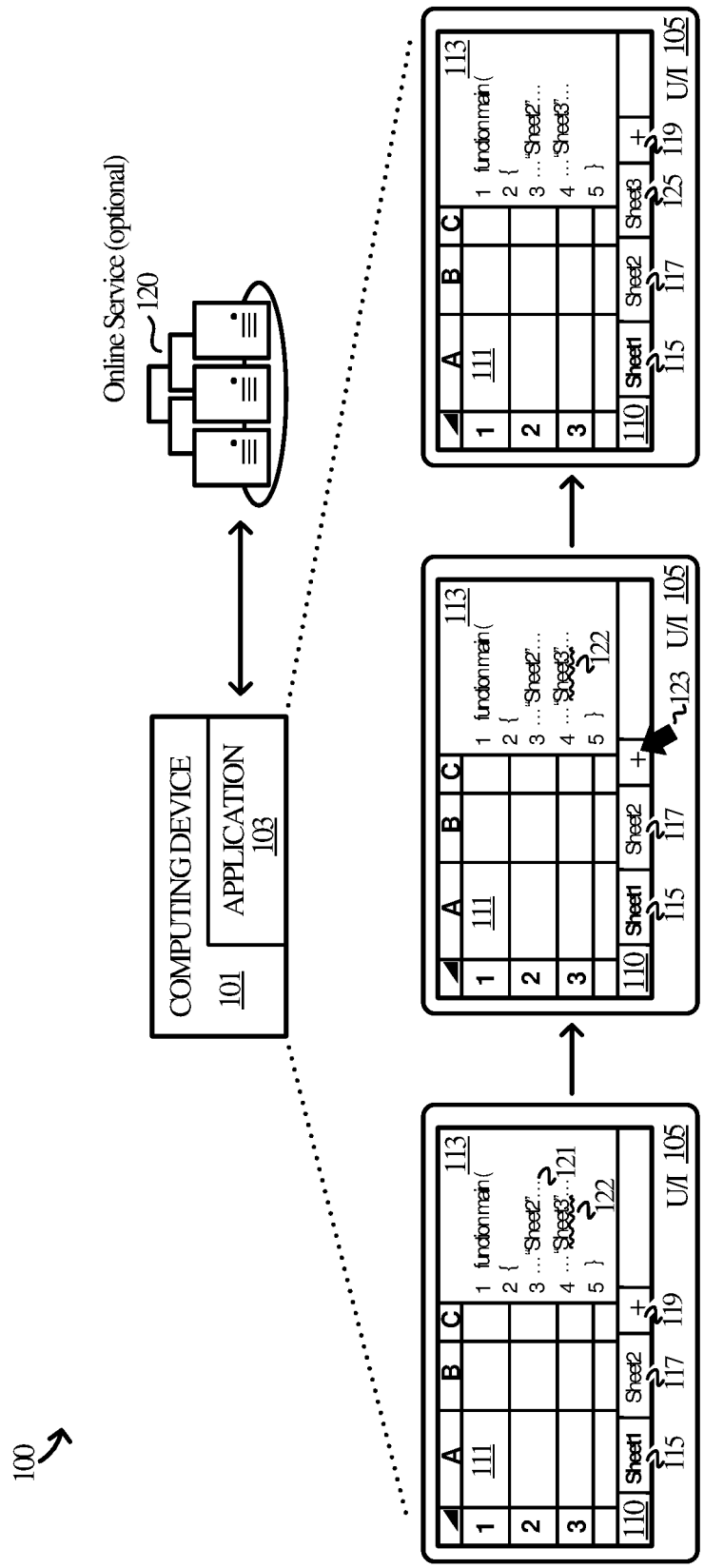
FIG. 1 illustrates a user experience with respect to a computing device in an implementation of enhanced code linting.
Figure 9:
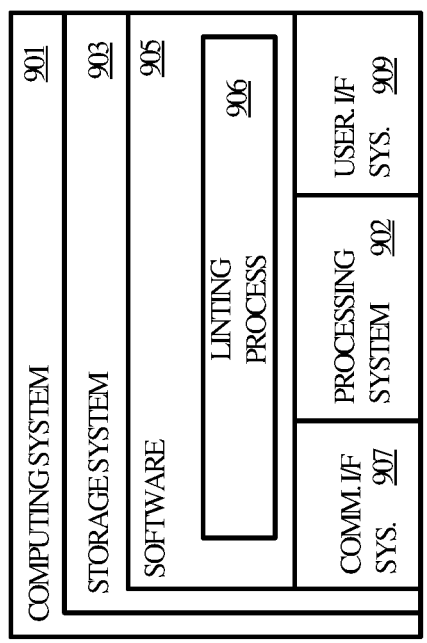
FIG. 9 illustrates a computing system suitable for implementing the various operational environments, architectures, processes, scenarios, and sequences discussed below with respect to the other Figures.

Referring now to the drawings, FIG. 1 illustrates a user experience 100 in an implementation. User experience 100 includes a computing device 101 with which a user may interact in the context of an application 103 and its features and functionality. Examples of computing device 101 include personal computers, tablet computers, mobile phones, and any other suitable devices, of which computing device 901 in FIG. 9 is broadly representative.

Computing device 101 includes one or more software applications, of which application 103 is representative. Application 103 is representative of any software application in which a user can open and edit content such as spreadsheet workbooks, word processing documents, digital notebooks, slide presentations, emails, or the like. Examples of application 103 include—but are not limited to—spreadsheet applications, word processing applications, digital notebook applications, email applications, and workflow automation applications. Application 103 may be a natively installed and executed application, a browser-based application, a mobile application, or any other application suitable for experiencing spreadsheets, tables, and the like. Application 103 may execute in a stand-alone manner (as in the case of a natively installed application) or within the context of another application (as in the case of a browser-based application), or in some other manner entirely.

User experience 100 may optionally include online service 120 in some implementations. Online service 120 may provide one or more computing services to end points such as computing device 101. For example, online service 120 may host all or portions of the workbook displayed in user interface 105, and all or portions of productivity applications. It may therefore be appreciated that some of the features and functionality attributed to application 103 on computing device 101 may be performed by online service 120 in some implementations. Online service 120 may provide a variety of other services including file storage, co-authoring and collaboration support, and the like. In some examples, online service 120 may provide a suite of applications and services with respect to a variety of computing workloads such as office productivity tasks, workflow automation tasks, email, chat, voice and video, and so on. Online service 120 employs one or more server computers co-located or distributed across one or more data centers connected to computing device 101. Examples of such servers include web servers, application servers, virtual or physical (bare metal) servers, or any combination or variation thereof, of which computing device 901 in FIG. 9 is broadly representative. Computing device 101 may communicate with online service 120 via one or more internets and intranets, the Internet, wired and wireless networks, local area networks (LANs), wide area networks (WANs), and any other type of network or combination thereof.

Figure 2:
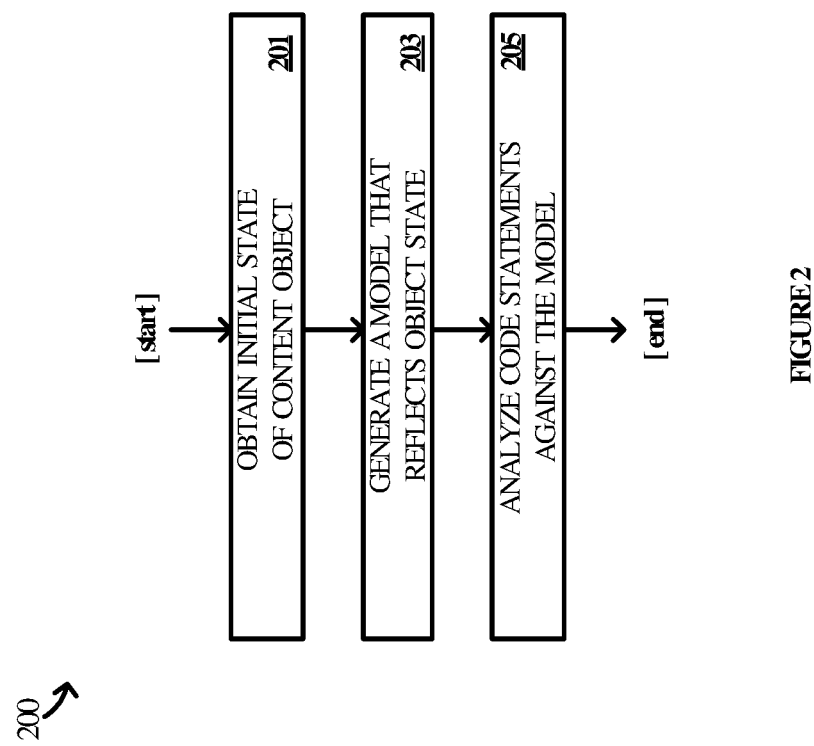
FIG. 2 illustrates a linting process in an implementation.

FIG. 2 illustrates a linting process 200 in an implementation. Linting process 200 may be implemented in program instructions in the context of any of the software applications, modules, components, or other such elements of one or more computing devices. For example, process may be employed by an application on computing device 101 (e.g., application 103), or by an application running in the context of online service 120. The program instructions direct the one or more computing devices to operate as follows, referred to in the singular for the sake of clarity.

In operation, the computing device displays a user interface to a code editor in which the user can edit source code intended to run in the context of an application. The code editor may be an integrated feature of the application, an add-in to the application, or another application entirely. The computing device displays code statements in the user interface that comprise one or more scripts for automating tasks with respect to one or more content objects in the application. A spreadsheet workbook is an example of a content object, while the worksheets, tables, charts, cells, or even individual cells are examples of the elements that comprise the content object. Other examples include images, slides, sections, or any other type of element that may exist in a content object. Additional examples of content objects include word processing documents, slide presentations, digital notebooks, emails, and the like.

The computing device obtains an initial state of the content object(s) referenced in the code statements (step 201). State information may be obtained by the linting process from one or more resources of the application that hosts the content object. In some examples, the linting process utilizes an application programming interface (API) to communicate with an application resource that tracks or otherwise manages object state. The linting process could submit individual queries via the API to the application resource to ascertain whether an individual element exists in a content object. Alternatively (or in addition), the linting process could query the application resource for a list of elements in an object, obtain the state information on a regular basis, or otherwise obtain the state information in-bulk rather than by individual queries.

Next, the computing device, as directed by the linting process, generates a model that reflects the state of the content object (step 203). The linting process maintains the model in memory such that it can be referenced and updated when analyzing code statements. The model may be as simple as a list of elements in a content object identified and/or organized by their names. In other scenarios, the model may be more complex such as a replica (copy) of the content object being analyzed. Still other models are possible and may be considered within the scope of the present disclosure.

With the model in-hand, the computing device proceeds to analyze code statements in view of the model (step 205). For example, references in the statements to elements in the object can be checked against the model to determine if a given reference actually exists in the real instance of the object. In some cases, the absence of the element in the model leads the computing device to surface a representation of the error in the user interface to the code editor. In other cases, the reference to an element may be within a statement calling for the creation of the element in the object, in which case the model can be updated to reflect the implied existence of the element. The model may be continuously updated based on implied changes to the object called for in the code statements. However, an external change to the object itself may trigger a complete refresh of the model.

As user interacting with the code editor can take various steps in response to errors that are identified and surfaced by a linting process. For instance, a user can edit the code statements to replace, remove, or correct an erroneous reference to a non-existent element. The user could also interact with the content object itself to add the referenced element to the object so that the element is no longer identified by the linter as non-existent.

Referring back to FIG. 1, user experience 100 includes a brief example of a linting process (e.g., linting process 200) employed in the context of application 103 on computing device 101. In operation, application 103 opens a spreadsheet workbook and displays view 110 of the workbook in user interface 105. User interface 105 includes a view 110 of a spreadsheet workbook and a view 113 of a code editor for editing code statements that run in the context of the workbook. View 110 includes a cell grid 111 defined in terms of the rows and columns of an active worksheet of the workbook. The workbook includes multiple worksheets represented by worksheet 115 and worksheet 117, as well as a button 119 for adding new worksheets. View 113 of the code editor includes a canvas on which to type or otherwise edit code statements 121. The canvas includes line numbers to allow for easy reference to individual statements.

In the background, the linting process runs to identify and surface problematic aspects of code statements 121. As mentioned, the linting process could be an integrated component of application 103, an add-in component, or even a component of another application that is separate from application 103. The linting process obtains an initial state of the workbook(s) opened by application 103 and builds an internal model from the state information. In this example, the state information indicates that the workbook includes two worksheets (Sheet1 and Sheet2). The linting process obtains the state information by calling a resource of application 103 through an API.

Next, the linting process begins to examine the code statements, beginning with the statement at line 1 and moving through the statements in numerical order. Each statement is parsed for references to elements of the workbook. The references are then checked against the model to determine whether they exist (or will exist once a particular statement is encountered). If an element does not yet exist as indicated by the model, the linting process surfaces an indication of the error to bring it to the attention of the user.

For example, the statement at line 4 includes a reference to worksheet ("Sheet 3"), which per the model is a non-existent element of the workbook. An error indicator 122 is surfaced under the reference in the code statement to bring the error to the user's attention. To fix the problem, the user proceeds to add a new worksheet by clicking on or otherwise selecting button 119. The selection 123 of button 119 may be made via a mouse click, a touch gesture, a spoken command, or some other suitable user input.

Adding the new worksheet 125 to the workbook causes the linting process to refresh its model of the workbook. The refreshed version of the model now indicates that the workbook includes three worksheets: Sheet1, Sheet2, and Sheet3. As the linting process again parses the statements and encounters the reference to Sheet3, it will conclude the Sheet3 exists in the model and the error indicator 122 will be removed.

Figure 3:
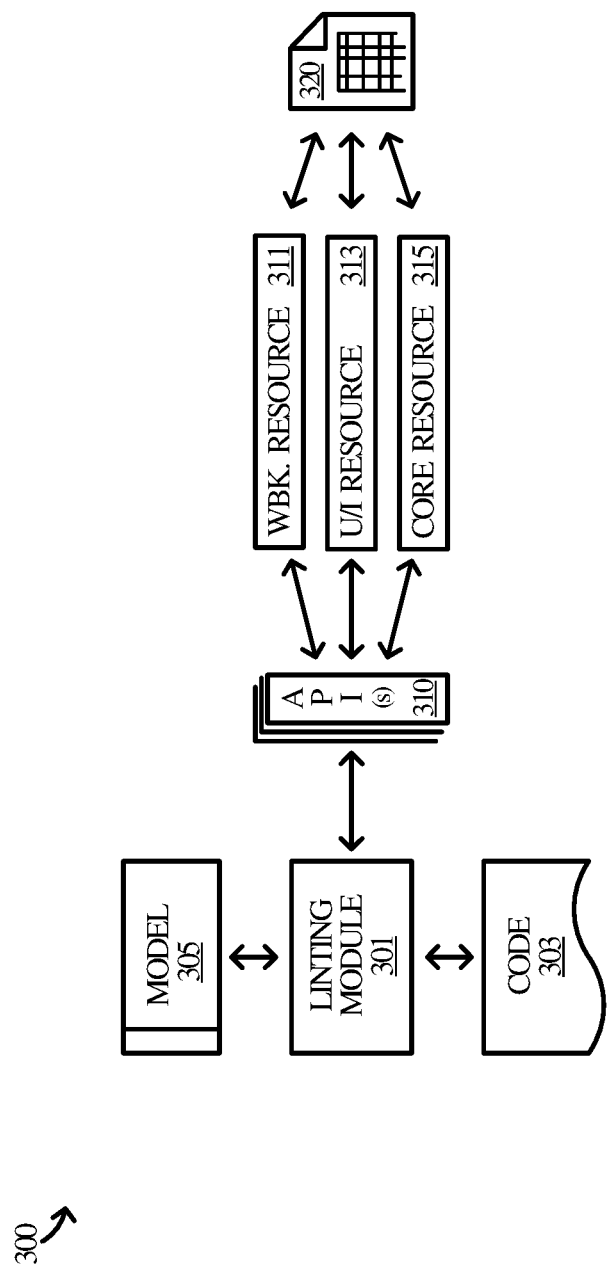
FIG. 3 illustrates a linting module within the context of a software architecture in an implementation.

FIG. 3 illustrates a software architecture 300 in an embodiment, demonstrating a context in which a linting process may operate. Software architecture 300 includes linting module 301 and various application resources represented by workbook resource 311, user interface resource 313, and core resource 315. Linting module 301 communicates with one or more of the application resources through one or more application programming interfaces (APIs), represented by API 310. Linting module 301 also interacts with code statements (code 303) and a content object model (model 305).

Figure 7:
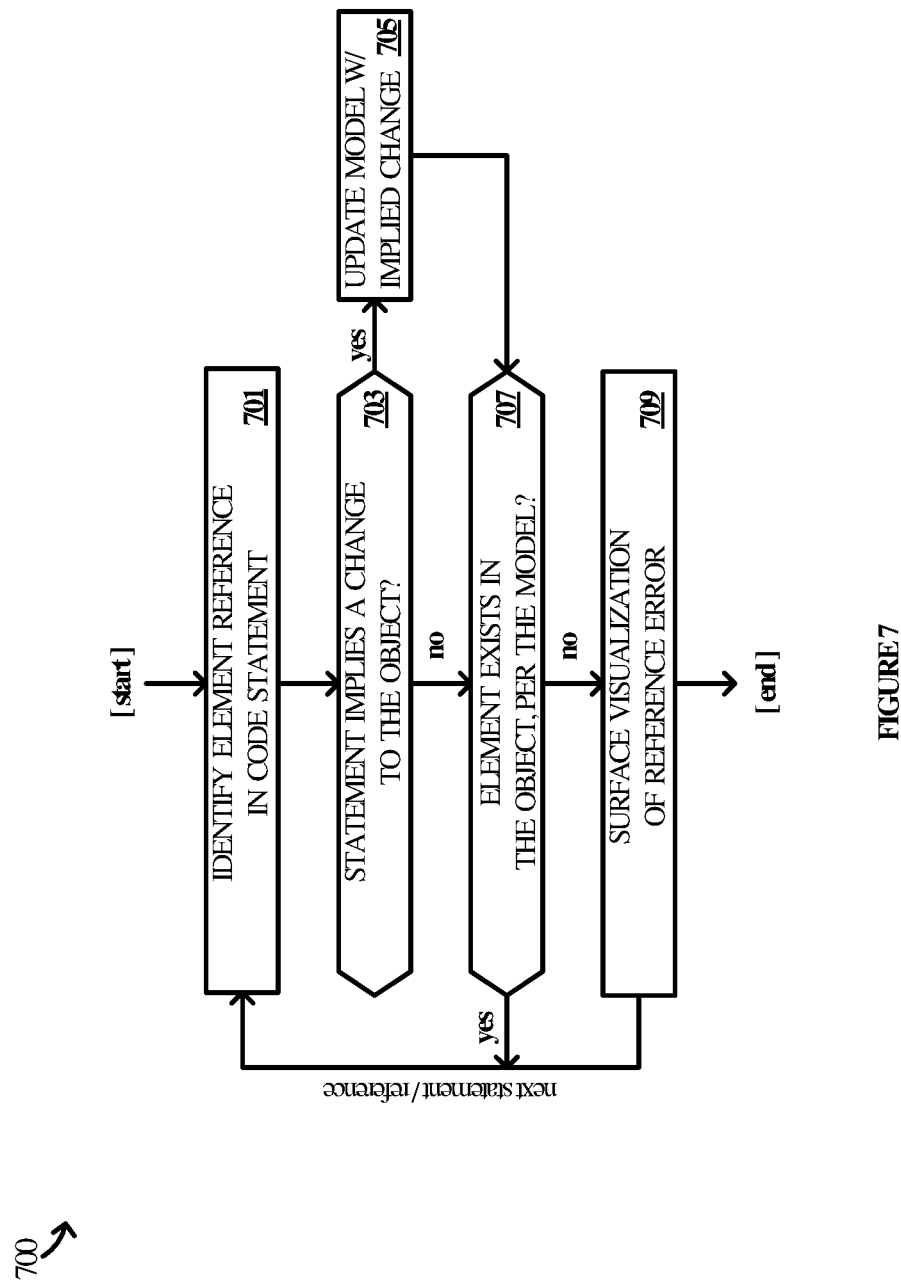
FIG. 7 illustrates another linting process in an implementation.

Linting module 301 is representative of one or more software components configured to carry out a linting process such as linting process 200 in FIG. 2 or linting process 700 in FIG. 7. Linting module 301 communicates with workbook resource 311 to obtain state information on the content object(s) hosted in the context of a software application, of which content object 320 is representative. Examples of such software applications include spreadsheet applications, word processing applications, and the like. Workbook resource 311 is representative of a component or components of the application that manages or otherwise tracks the state of content objects in the application.

Linting module 301 may also communicate with user interface 313 through one or more of the APIs (e.g., API 310). Linting module 310 may communicate with user interface resource 313 to, for example, surface indications of errors in a user interface to a code editor. In other scenarios, linting module 310 may communicate directly with the code editor to make it aware of errors, allowing the code editor to communicate with the appropriate user interface elements of the application. Core resource 315 is representative of the main business logic of the software application. Core resource 315 may be, for example, the main process of the software application and handles the primary tasks of the application.

In operation, linting module 301 tracks the state of content objects through calls to workbook resource 311. Workbook resource 311 provides state information to linting module 301 that it uses to generate and update a model of each content object, represented by model 305. Linting module 301 also inspects and analyzes code 303 in view of the state information in model 305 to determine whether any errors or problems exist in code 303. Linting module 301 continuously, periodically, or on some other programmatic basis checks the statements in code 303 against the representation of a content object in model 305 to determine whether references to elements are valid. Invalid references can be displayed and highlighted to a user through user interface resource 313, allowing the user to take corrective action.

Figure 4:
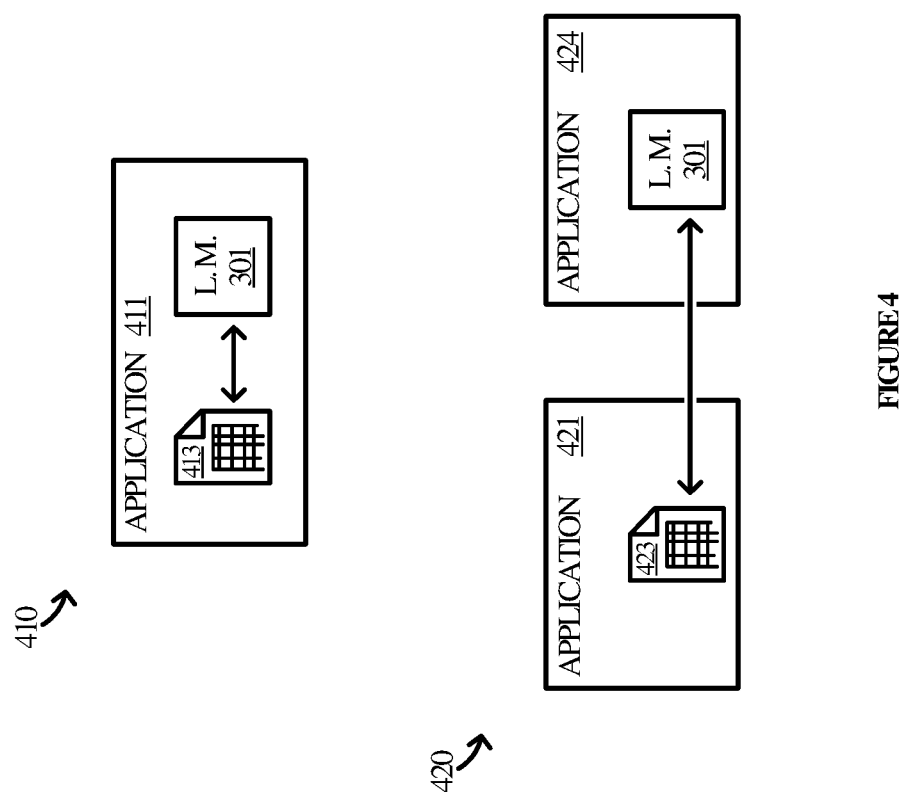
FIG. 4 illustrates a linting module in various application environments.

FIG. 4 illustrates various application environments in which linting module 301 from FIG. 3 may be deployed. In a first example, application environment 410 includes an application 411 that itself includes content object 413 as well as linting module 301. An example of content object 413 is a spreadsheet workbook or word processing document, while examples of application 411 include spreadsheet applications, word processing applications, or any other type of productivity software.

Linting module 301 in this example is deployed in the context of application 411. Linting module 301 could be, for example, an integrated feature of application 411 or an add-in feature of application 411. Linting module 301 may communicate with application 411 and its resources via an API or directly with the main process or other sub-processes of the application. Linting module 301 communicates with application 411 to obtain state information about the elements of content object 413. As mentioned, example elements include the various worksheets of a spreadsheet workbook, the tables in the workbook, individual cells or groups of cells, images, charts, pivot tables, or any other type of object element.

Linting module 301 monitors code statements written in a code editor that are intended to run against content object 413. The code editor may be an integrated feature of application 411 such that a user interface to the code editor is displayed within the context of a user interface to application 411 more generally. Linting module 301 monitors the code statements for errors or problems in view of a modeled state of content object 413. Linting module 301 maintains the modeled state by querying application 411 either via an API or by communicating directly with its main process or sub-processes. Visual indications of any errors or problems discovered by linting module 301 can be surfaced in the user interface to the code editor provided by application 411.

Application environment 420 represents a different scenario than application environment 410, in that linting module 301 resides within the content of an application other than the application that hosts the relevant content item. Application environment 420 includes application 421 and application 424. Whereas application 421 may be a spreadsheet application, for example, application 424 is representative of other types of applications in which a user may edit code statements intended to run at least partially against content items hosted in other applications. Examples of application 424 include workflow automation applications as well as any other type of productivity application.

Here, application 421 hosts content item 423, while application 424 hosts linting module 301. That is, application 424 includes a code editor through which a user can view and edit code statements for automating tasks with respect to content item 423. Linting module 301 communicates with application 421 to obtain state information about content item 423, which it uses to construct and update a model of content item 423. Linting module 301 then evaluates the code statements in a continuous manner to identify and surface any errors or problems that may exist in view of the object state reflected in the model. Linting module 301 may communicate with application 421 through an API provided by application 424 for cross-application communications. In the same or scenarios, back-end protocols support the inter-process or inter-application communication required for linting module 301 to obtain such state information. Thus, while application 421 and application 424 may be co-located with respect to each other (e.g., running on the same computer), they could also be implemented in a distributed or remote manner with respect to each other (e.g., running on separate computers).

Figure 5:
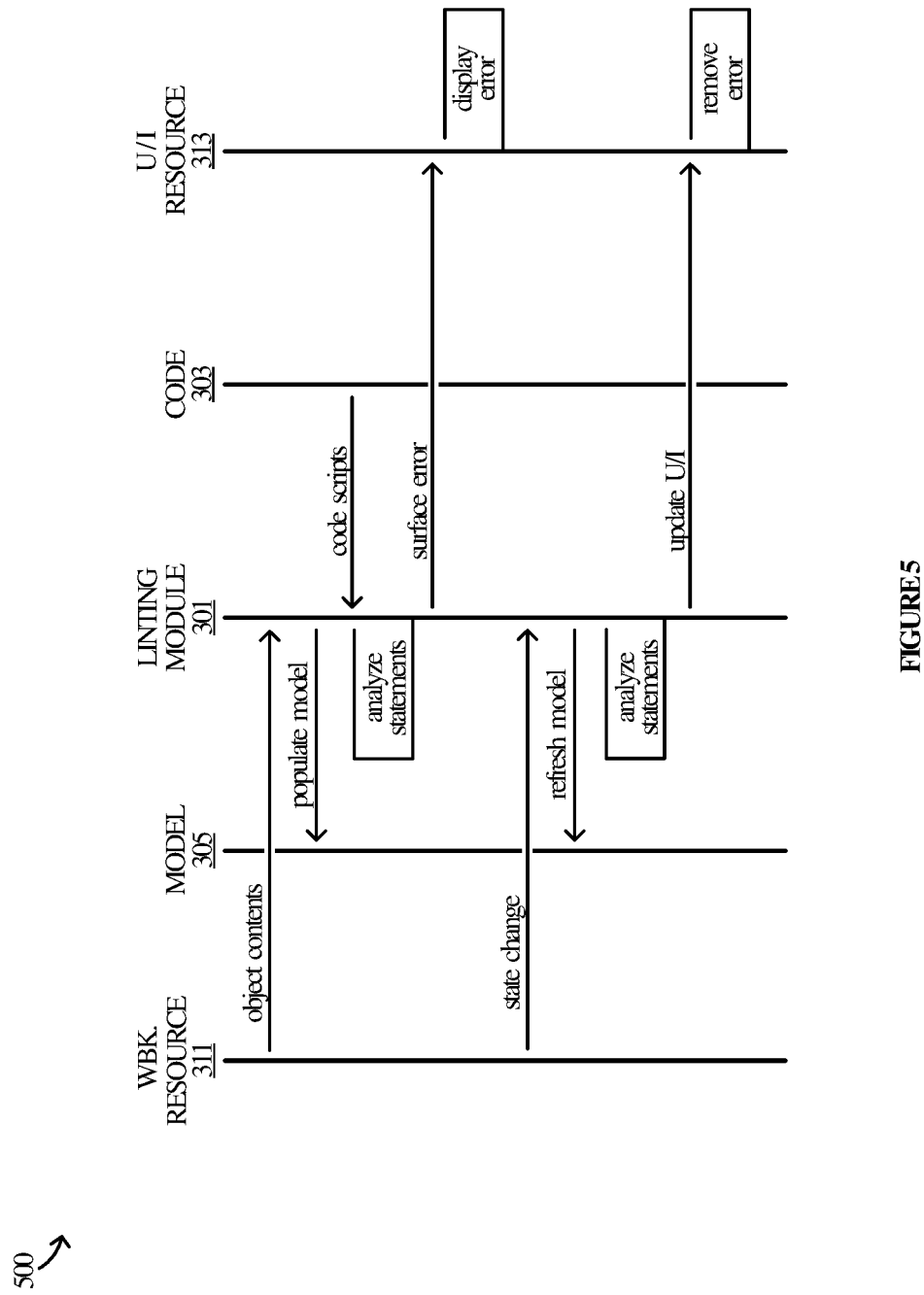
FIG. 5 illustrates an operational scenario in an implementation.

FIG. 5 illustrates an operational scenario 500 with respect to aspects of software architecture 300 in FIG. 3. In operation, workbook resource 311 provides linting module 301 with state information about content object 320. The state information indicates, for example, the elements that currently exist in content object 320. Linting module 301 populates model 305 with the state information such that model 305 can later be queried to determine if a referenced element exists in the object.

Linting module 301 proceeds to examine the script(s) in code 303. A script comprises a set of code statements that may (or may not) reference elements of a content object. Linting module 301 evaluates each statement to determine whether a given reference to an element is correct or requires corrective attention. Linting module 301 does so by checking model 305 to determine whether the referenced element exists yet in the model of the content object. If not, then linting module 301 communicates with user interface resource 313 to surface an indication of the error in a user interface to a code editor supported by the application.

It is assumed here for exemplary purposes that an error was identified, and an indication of the error was surfaced in the code editor's user interface. It is further assumed that the user takes corrective action with respect to an identified error such as by adding a new worksheet, adding a new table, or otherwise making a change to the content object that changes its state. Workbook resource 311 provides an indication of the state change to linting module 301. Linting module refreshes model 305 accordingly to reflect the new state and proceeds to re-analyze the statements in code 303 to determine whether any errors exist in view model 305 after its refresh. It is further assumed that the previous error was solved by the changes made by the user, causing linting module 301 to submit a refresh of its own to user interface resource 313 to remove the error from the code editor's user interface.

Figure 6:
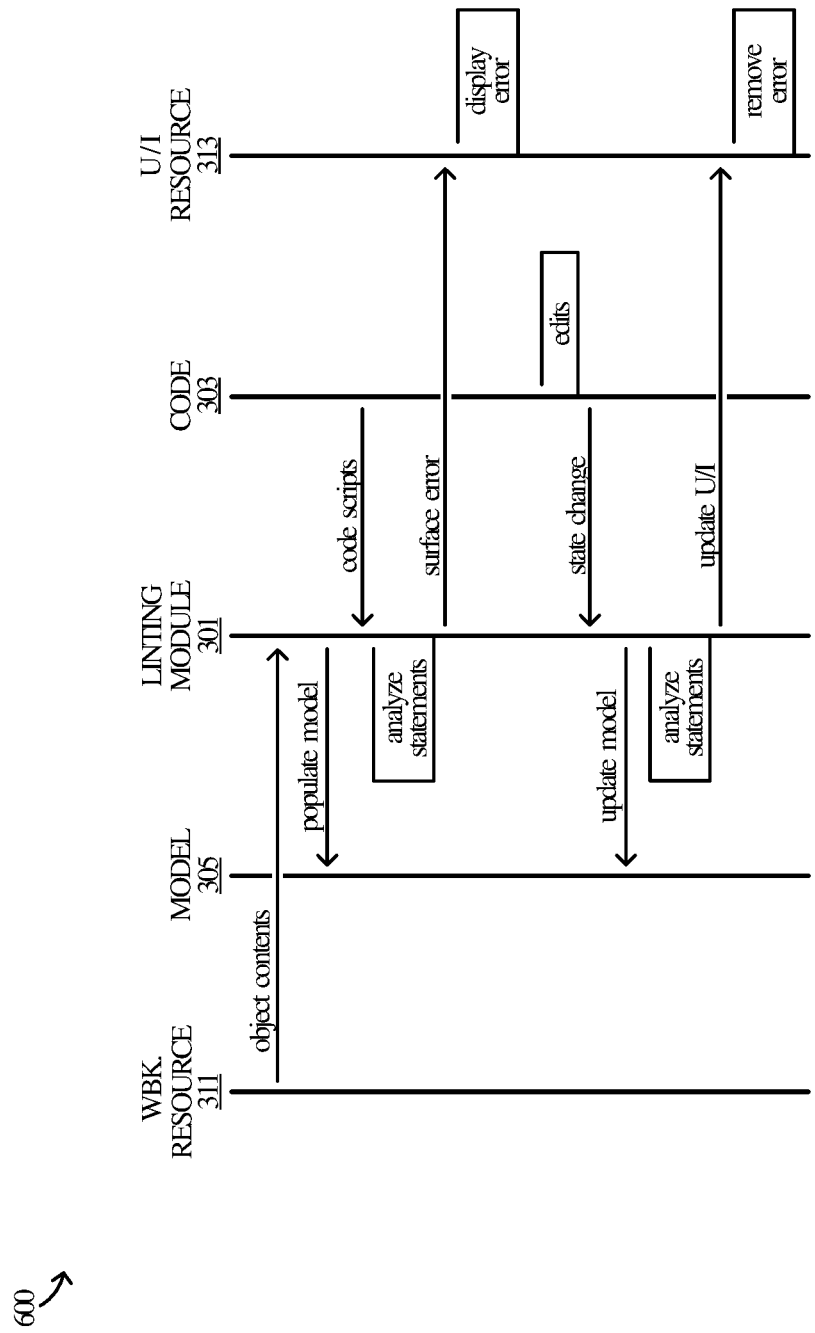
FIG. 6 illustrates another operational scenario in an implementation.

FIG. 6 illustrates another operational scenario 600 with respect to aspects of software architecture 300 in FIG. 3. In operation, workbook resource 311 provides linting module 301 with state information about content object 320. The state information indicates again the elements that currently exist in content object 320. Linting module 301 populates model 305 with the state information such that model 305 can later be queried to determine if a referenced element exists in the object.

Linting module 301 proceeds to examine the script(s) in code 303. Linting module 301 evaluates each statement in view of model 305 to determine whether a given reference to an element is correct or requires corrective attention. Linting module 301 does so by checking model 305 to determine whether the referenced element exists yet in the model of the content object. If not, then linting module 301 communicates with user interface resource 313 to surface an indication of the error in a user interface to a code editor supported by the application.

It is assumed again that an error was discovered, and its presence surfaced in the code editor. However, rather than fixing the error by interacting with the workbook, the user instead addresses the error by editing code 303 via the code editor. It is further assumed that the edits to the code would cause a state change with respect to the content object if implemented at runtime. Such a change may be considered an "implied change" since it is implied by one or more of the statements in code 303.

Linting module 301 recognizes the implied change and updates model 305 to reflect the implied change. Moreover, linting module 301 continues to evaluate the statements in code 303 in view of the updated version of model 305. Since the implied change presumably rectified the previously identified error, linting module 301 concludes that the indication of the error can be removed from the code editor's user interface. Accordingly, linting module 301 communicates with user interface resource 313 to remove the indication.

FIG. 7 illustrates another linting process 700 in an implementation. Linting process 700 may be implemented in program instructions in the context of any of the software applications, modules, components, or other such elements of one or more computing devices. For example, process may be employed by an application on computing device 101 (e.g., application 103), or by an application running in the context of online service 120. Linting process 700 could also be employed by a linting module (e.g., linting module 301). Linting process 700 could also be implemented within the context of other linting processes such as linting process 200. The program instructions direct the one or more computing devices to operate as follows, referred to in the singular for the sake of clarity.

In operation, the computing device displays a user interface to a code editor in which the user can edit source code intended to run in the context of an application. The computing device displays code statements in the user interface that comprise one or more scripts for automating tasks with respect to one or more content objects in the application. A spreadsheet workbook is an example of a content object, while the worksheets, tables, charts, cells, or even individual cells are examples of the elements that comprise the content object. Other examples include images, slides, sections, or any other type of element that may exist in a content object. Additional examples of content objects include word processing documents, slide presentations, digital notebooks, emails, and the like.

The computing device obtains an initial state of the content object(s) referenced in the code statements. State information may be obtained by the linting process from one or more resources of the application that hosts the content object. In some examples, the linting process utilizes an application programming interface (API) to communicate with an application resource that tracks or otherwise manages object state. The linting process could submit individual queries via the API to the application resource to ascertain whether an individual element exists in a content object. Alternatively (or in addition), the linting process could query the application resource for a list of elements in an object, obtain the state information on a regular basis, or otherwise obtain the state information in-bulk rather than by individual queries.

Next, the computing device, as directed by the linting process, generates a model that reflects the state of the content object. The linting process maintains the model in memory such that it can be referenced and updated when analyzing code statements. The model may be as simple as a list of elements in a content object identified and/or organized by their names. In other scenarios, the model may be more complex such as a replica (copy) of the content object being analyzed. Still other models are possible and may be considered within the scope of the present disclosure.

With the model in-hand, the computing device proceeds to analyze code statements in view of the model beginning at Step 701. At Step 701, the device identifies a reference to an element in a code statement. Next, the device determines whether the statement implies a change to the content object (step 703). If so, then the device updates the model to reflect the implied change (step 705) and proceeds to Step 707. If not, then the device proceeds directly to Step 707 to determine whether the element exists in the model (step 707).

At Step 707, the device determines whether an element exists in the model by looking for the element by its name in the model. If the element exists in the model, then the device concludes that no error is present with respect to that particular element reference and the process proceeds to the next reference and/or statement in the code. However, if the element does not exist in the content object per the model, then linting process 700 proceeds to Step 709. At Step 709, the computing device surfaces an indication of the error in a user interface to the code editor. The process continues if other references and/or statements remain to be checked.

FIGS. 8A-8I illustrate a user experience 800 in which the concepts disclosed and discussed in the preceding Figures are highlighted for exemplary purposes. User experience 800 relates to a view 801 of a spreadsheet workbook that may be rendered by a spreadsheet application in a user interface. View 801 includes a grid 805 defined by columns and rows of an active one of multiple worksheets in the workbook represented by Sheet1 and Sheet2.

In addition, view 801 includes sheet tabs 807 and 808 for navigating to and selecting one of the sheets as the active sheet. Button 809 represents a control for adding new worksheets to the workbook. The cells of the active sheet (Sheet1) include four tables represented by table 811 ("Sheet1Table1"), table 812 ("Sheet1Table2"), table 813 ("Sheet1Table3"), and table 814 ("Sheet1Table4").

View 801 also includes a user interface 820 to a code editor. User interface 820 includes a control block 821 and an editing canvas 825. Control block 821 includes various buttons corresponding to features and functionality of the code editor. For example, button 822 corresponds to a function for executing the code statements 827 written on editing canvas 825, while button 822 corresponds to a feature for saving changes to the code.

In operation, a suitable linting process (e.g., one or both of linting process 200 and linting process 700) builds a model of the workbook and analyzes code statements 827 against the model. Errors or problems discovered in the code are surfaced in user interface 820. For example, an indication 828 of a first error is surfaced in association with a reference to a non-existent object element ("Sheet3"). Because the workbook lacks any worksheet named "Sheet3," the linter surfaces a squiggly line beneath the reference to draw the user's attention to the error.

Figure 8A:
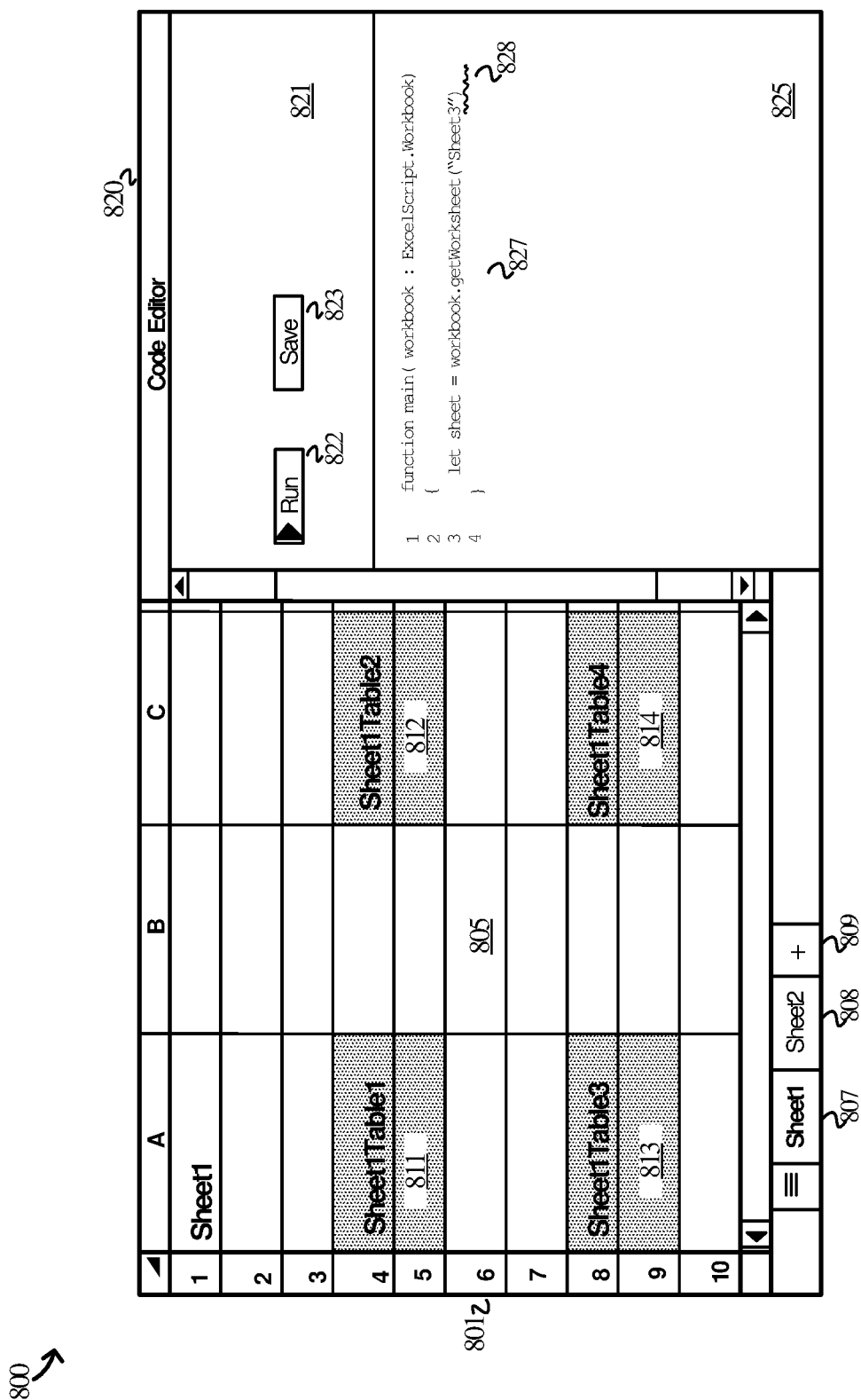
FIGS. 8A-8K illustrate another user experience in an implementation.
Figure 8B:
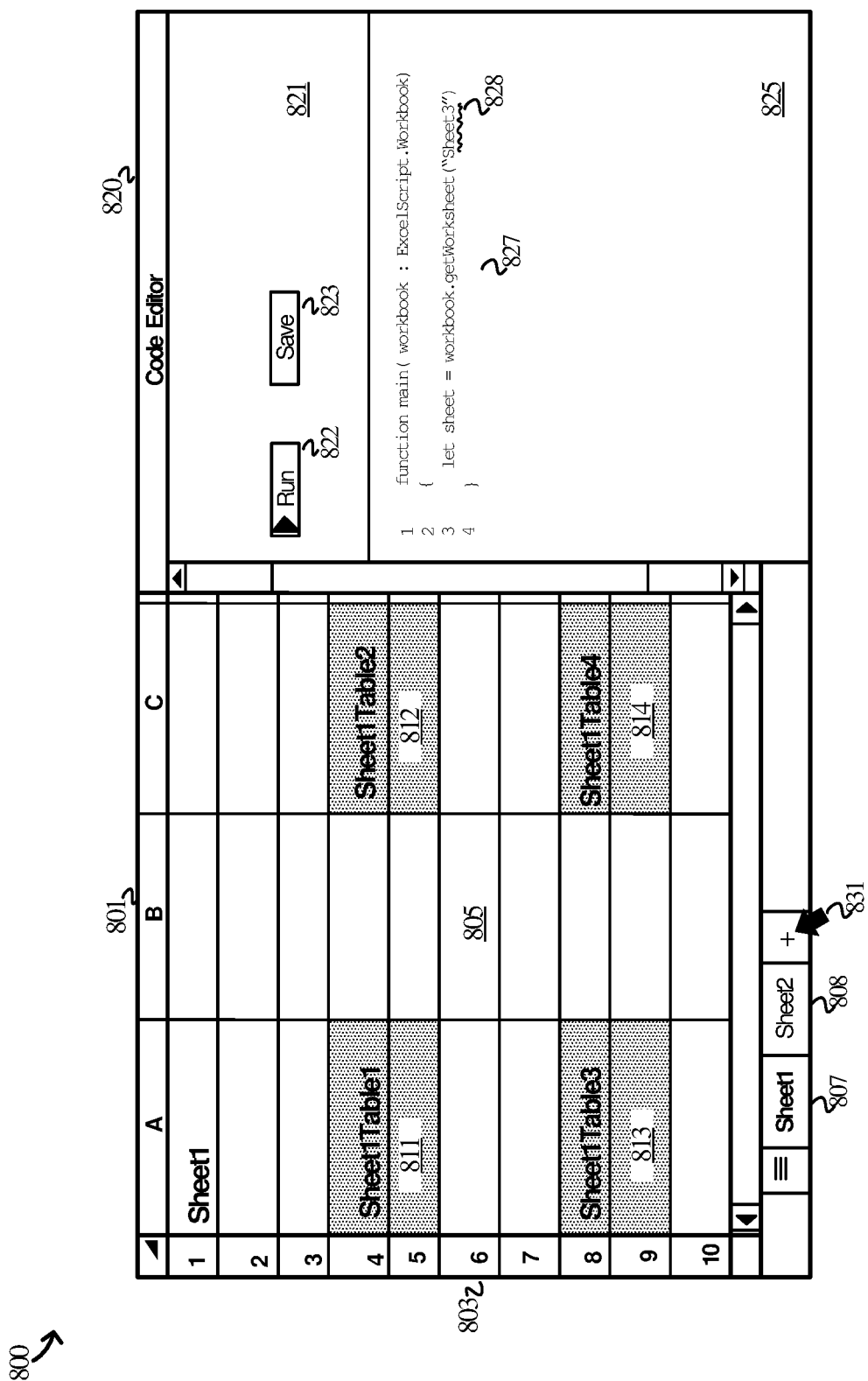

Transitioning to FIG. 8B, the user can remedy the error in a variety of ways. For example, the user could change the reference to the name of an existing element. However, it is assumed for exemplary purposes here that the user has decided to add a new worksheet to the workbook by user input 831. User input 831 represents a mouse click, touch gesture, or other suitable user input for engaging button 809. Selecting button 809 causes the spreadsheet application to add a new worksheet ("Sheet3"), the results of which are shown in FIG. 8C.

Figure 8C:
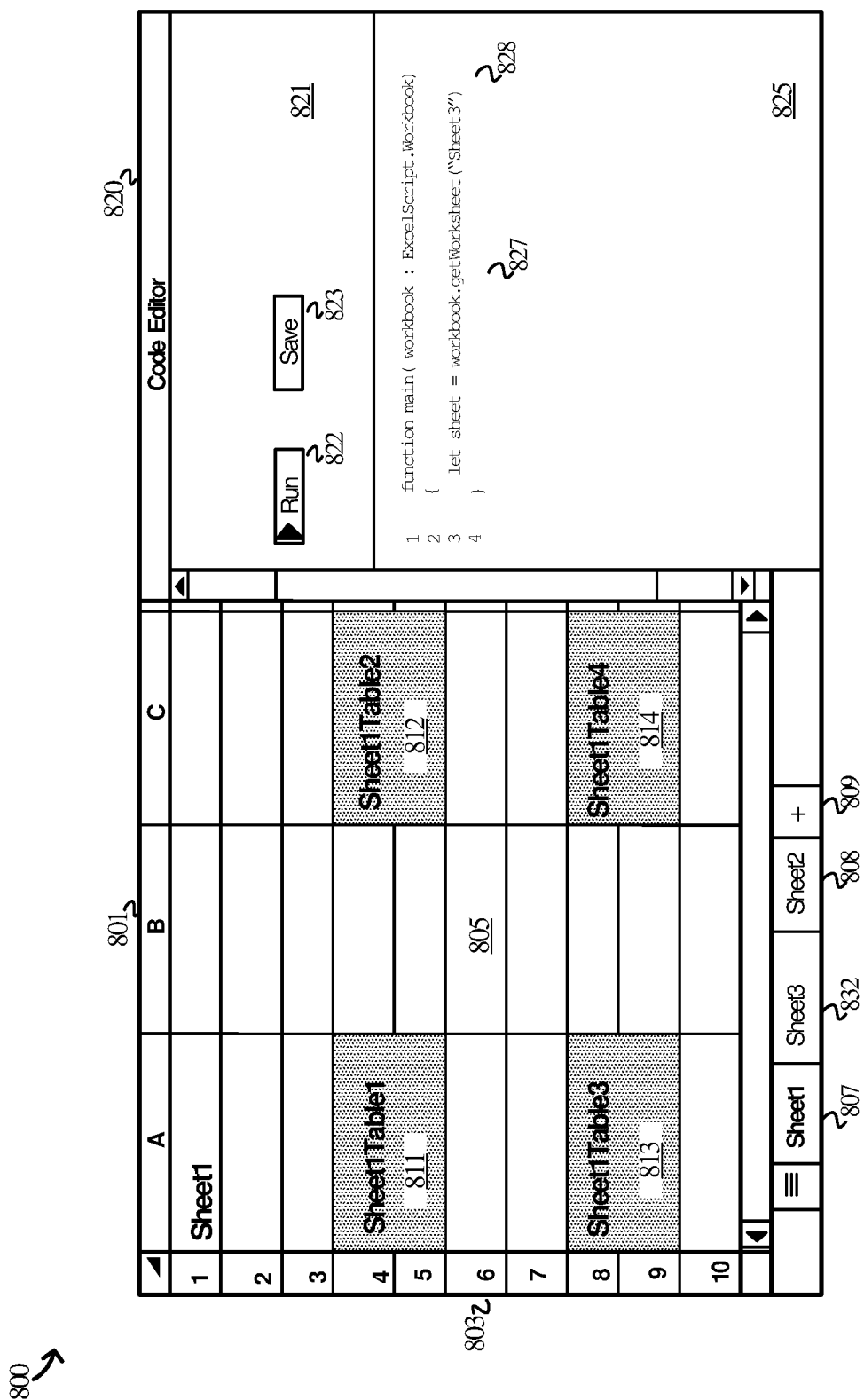

In FIG. 8C, the new worksheet has been added to the workbook. Accordingly, the linting process refreshes the model of the content object to reflect the new worksheet. In addition, as the linting process continues to analyze the code statements, the previously identified error is no longer an error because of the existence of Sheet3 in the workbook. The squiggly line beneath the reference in line 3 therefore is no longer present.

Figure 8D:
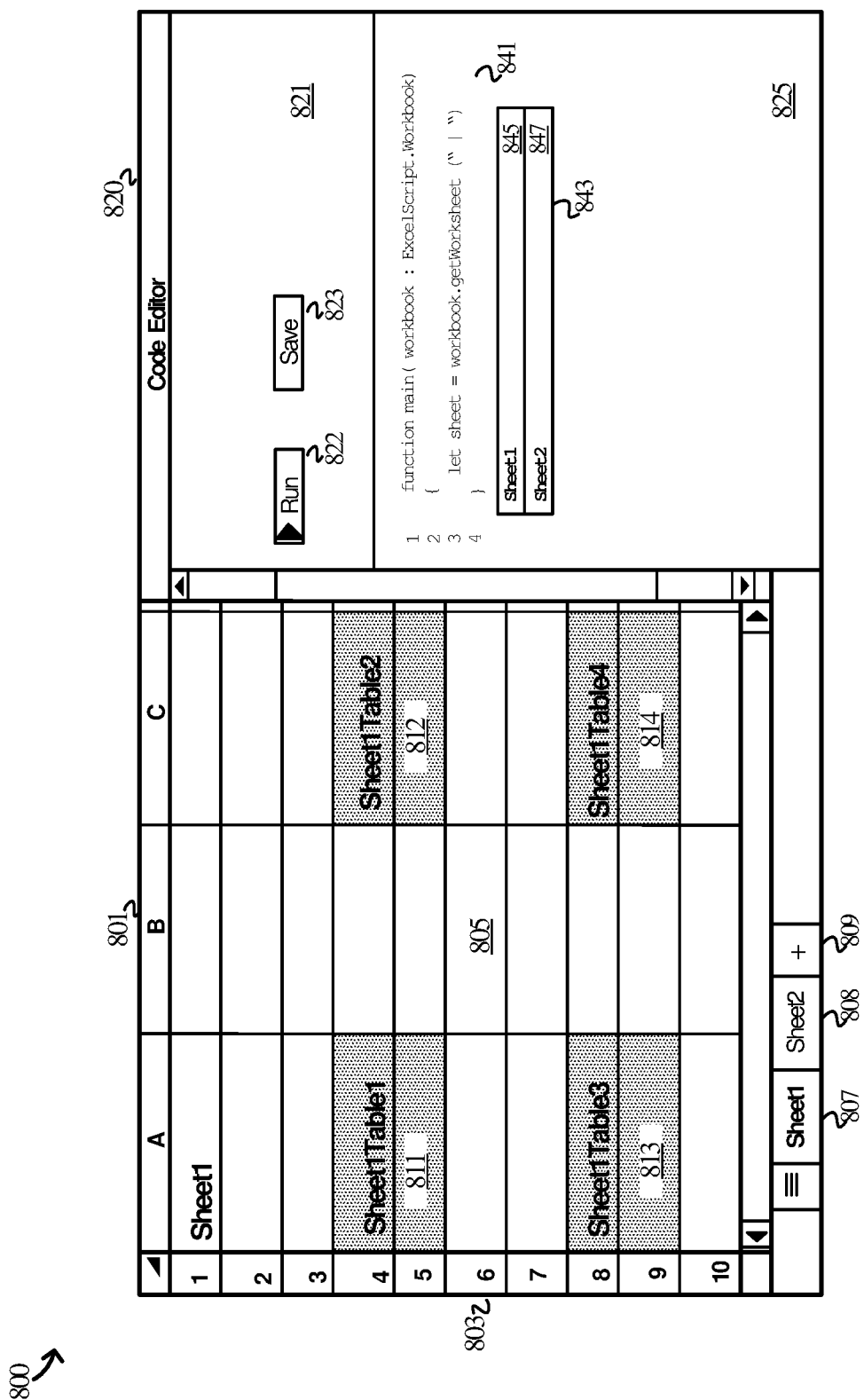

In FIG. 8D, the user has decided to edit the element name in line 3 of the code statements. Here, user input 841 represents a selection of and editing of text in line 3. The linting process and/or the code editor, being aware that the user is editing a parameter of a function in the statement, surfaces a suggestion box 843 with the names of elements eligible to serve as a parameter of the function. The first suggestion 845 identifies Sheet1, while the second suggestion identifies Sheet2. No other sheets are suggested as Sheet1 and Sheet2 are the only existing sheets at this moment in the user experience.

Figure 8E:
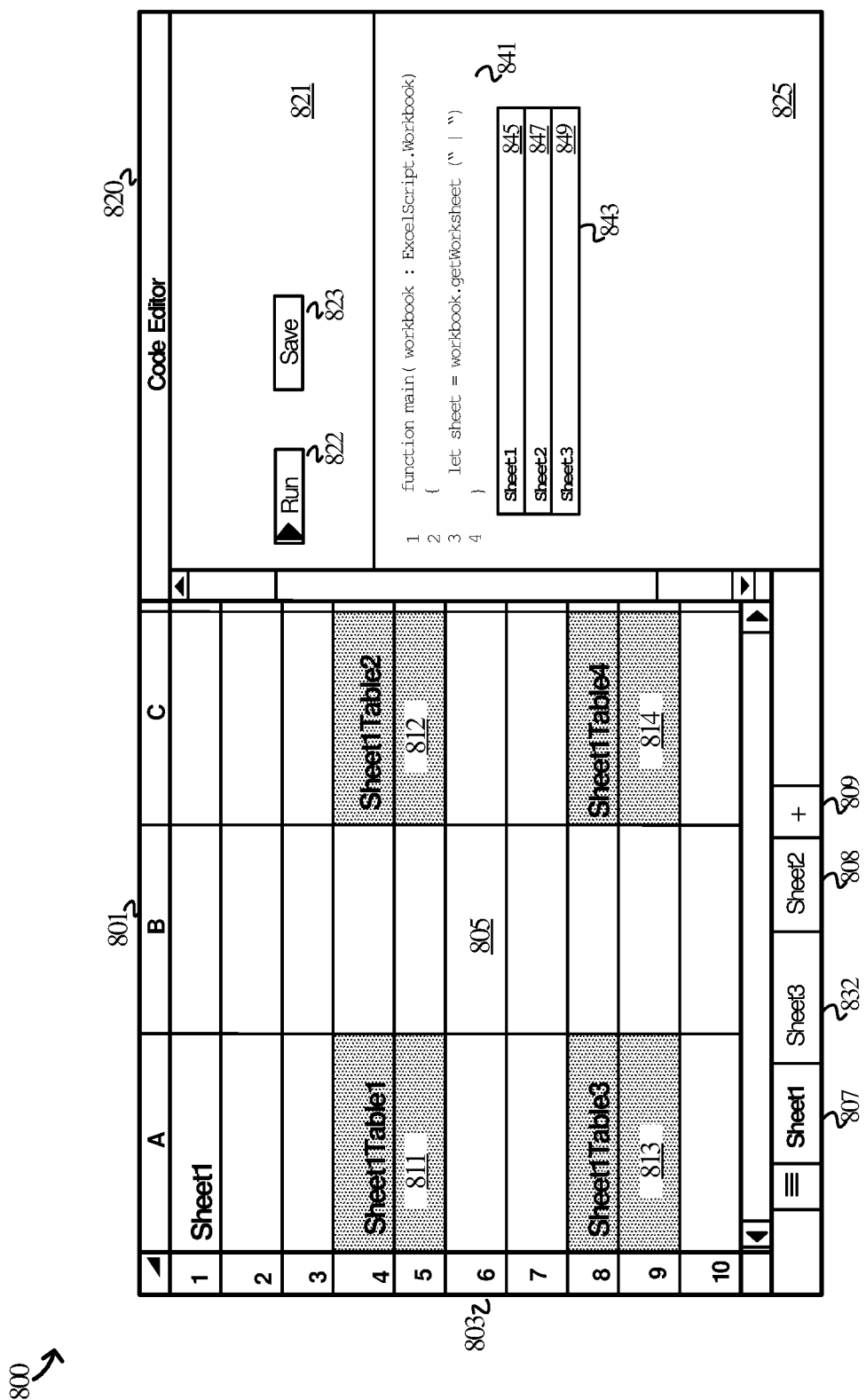

However, turning to FIG. 8E, it is assumed for exemplary purposes that the user has added a third worksheet to the workbook. Accordingly, when the user again moves to edit the parameter of the function in line 3, the suggestion box 843 is updated to include a third suggestion 849 that identifies Sheet3.

Figure 8F:
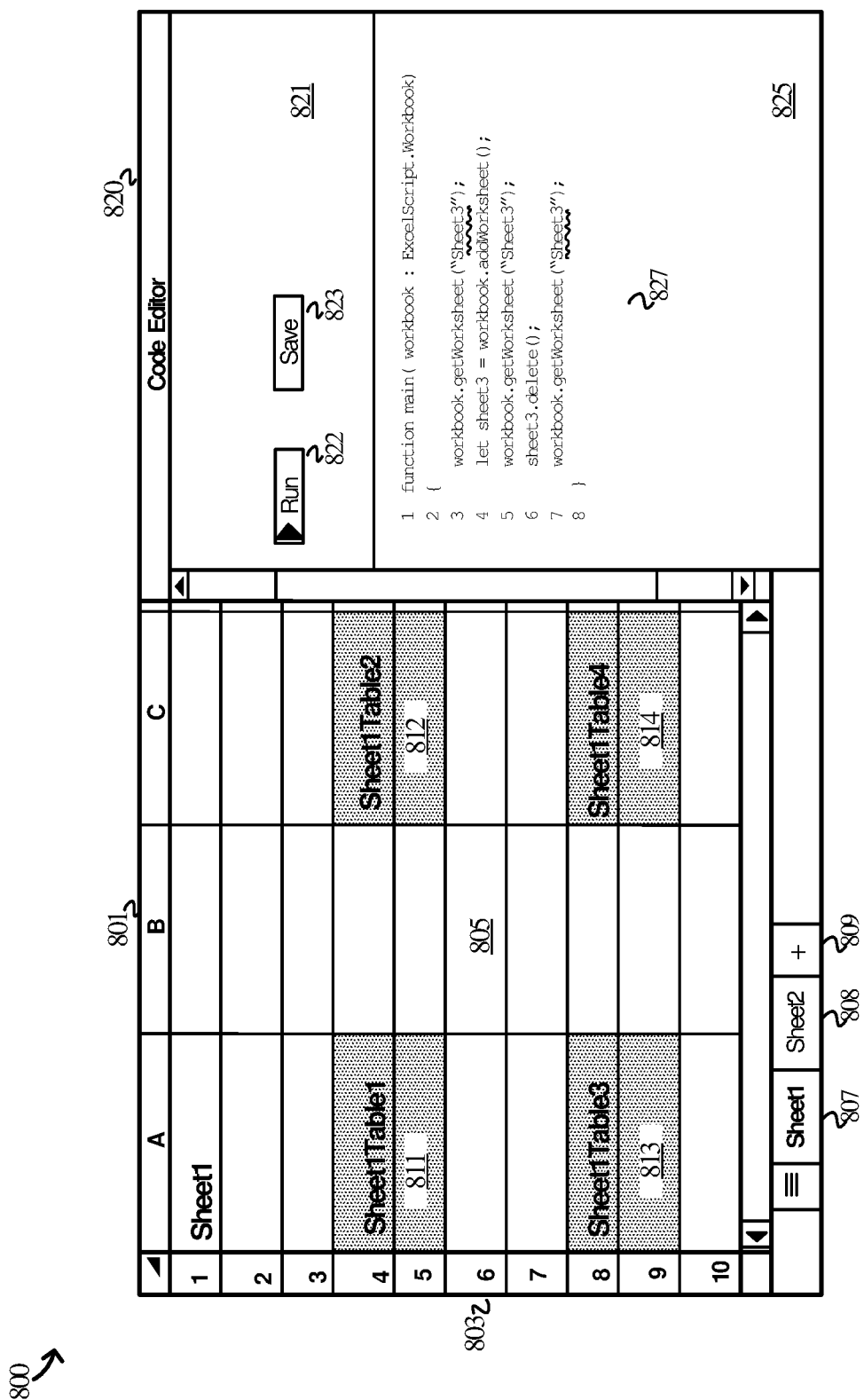

In FIG. 8F, the code statements have grown to include more functions, including functions in lines 3, 5, and 7. When working through the code statements, the linting process identifies the first reference to Sheet3 as erroneous, since the workbook at this moment lacks a Sheet3. However, the second reference to Sheet3 at line 5 is not considered an error by the linting process because the statement in line 4 calls for a new worksheet to be added to the workbook. The function line 4 would cause an "implied change" to the object model maintained by the linting process. Thus, when the linting process encounters the reference to Sheet3 in line 5, the reference is not considered to be an error, since the worksheet at runtime would exist when that line is encountered by the interpreter executing the code statements.

With that said, the third reference to Sheet3 at line 7 would be considered an error because the function at line 6 calls for the deletion of the active sheet. Thus, the reference to Sheet3 at line 7 is displayed with a squiggly line below it to identify the error to the user. The deletion of the Sheet3 is another example of an implied change that would cause the linting process to update the model, allowing it to recognize the error in line 7.

Figure 8G:
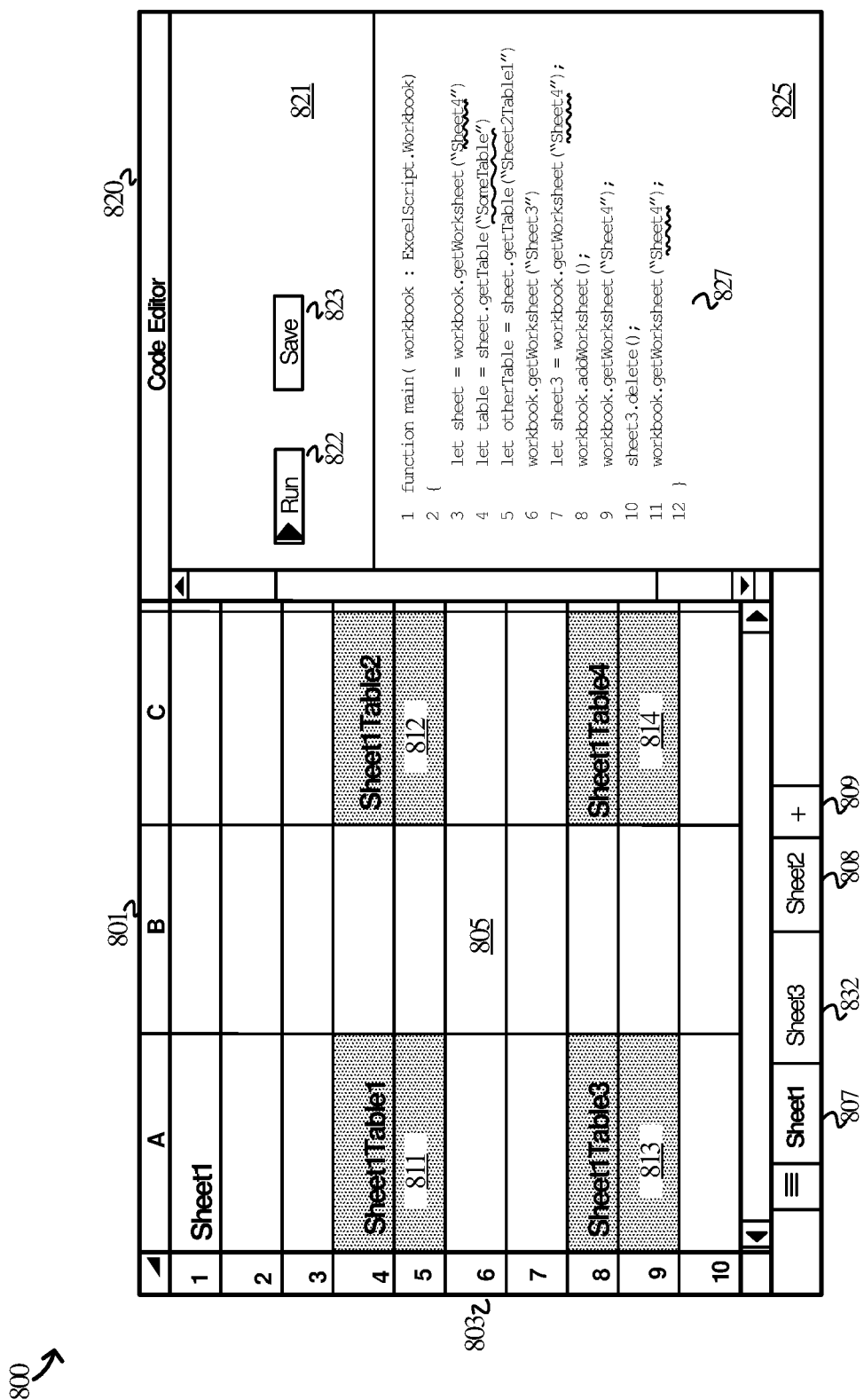

FIG. 8G illustrates a scenario whereby the code statements 827 now reference various tables in addition to worksheets. Here, the reference to Sheet4 is considered an error because, at that point in the code statements, Sheet4 does not exist. Likewise, the workbook lacks any table named "SomeTable" and so reference to it in line 4 is highlighted with an error graphic, although with a dotted line format to indicate that it is a matter of design choice. In this example, since Sheet4 does not exist at this point in the code, it is not possible to know whether SomeTable might exist. An aggressive approach may flat SomeTable as an error, but at the risk of being erroneous since Sheet4 could be created later. In fact, all references to getTable could be flagged with such an approach. Such an approach potentially causes visual clutter and risks valid errors being lost in the noise. A less aggressive approach would be to not flag SomeTable as an error since it could be created later in the code or by the user.

The reference to "Sheet2Tabel1" is not an error, assuming that Sheet2 includes a table with that name. In other words, the linting process is able to consider all of the elements of the entire workbook— not just those elements presently selected or active in the view of the workbook. Line 7 of the code statements also includes an erroneous reference to Sheet4, since it does not yet exist. However, line 8 calls for the addition of a new worksheet which, when carried out at runtime, will cause Sheet4 to be added to the workbook. Thus, the later reference to Sheet4 at line 9 is not an error, although the last reference to Sheet4 at line 11 is an error because the function at line 10 deleted the worksheet.

Figure 8H:
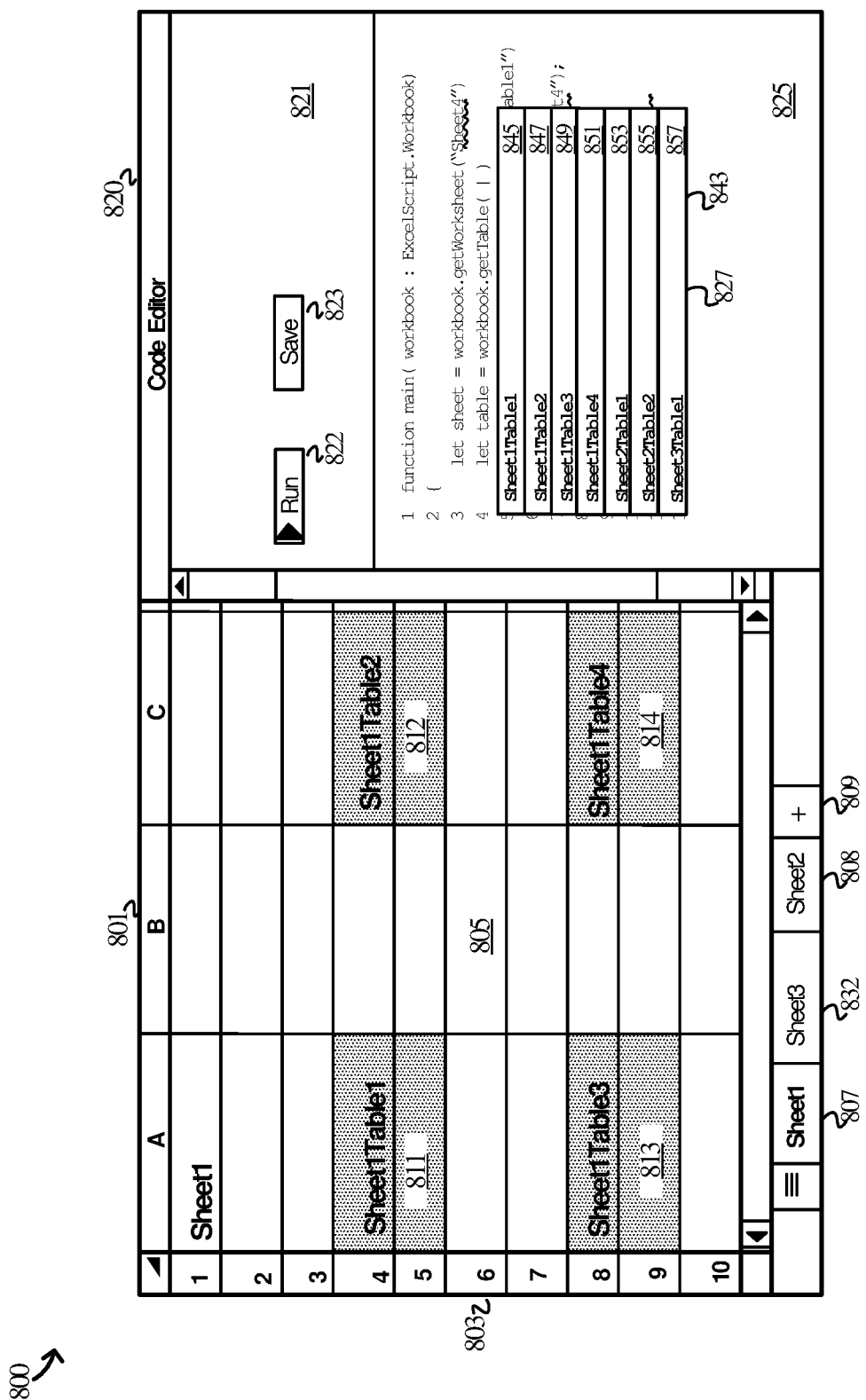

FIG. 8H illustrates the concept that the linting code and/or code editor can dynamically scope their analysis depending upon the logic implied by references in the code statements. Here, the user is editing a parameter name in line 4. The function "getTable" accepts table names as parameters. In addition, the function getTable is called on the entire workbook. The reference to "Sheet4" at line 3 is an error since Sheet4 does not yet exist in the object (the workbook). In addition, the scope of the suggestion box 843 is global and encompasses all of the tables of the workbook. As such, and in since the parameter is presently blank, all of the tables from the workbook are suggested—including tables from Sheet1, Sheet3, and Sheet2.

Figure 8I:
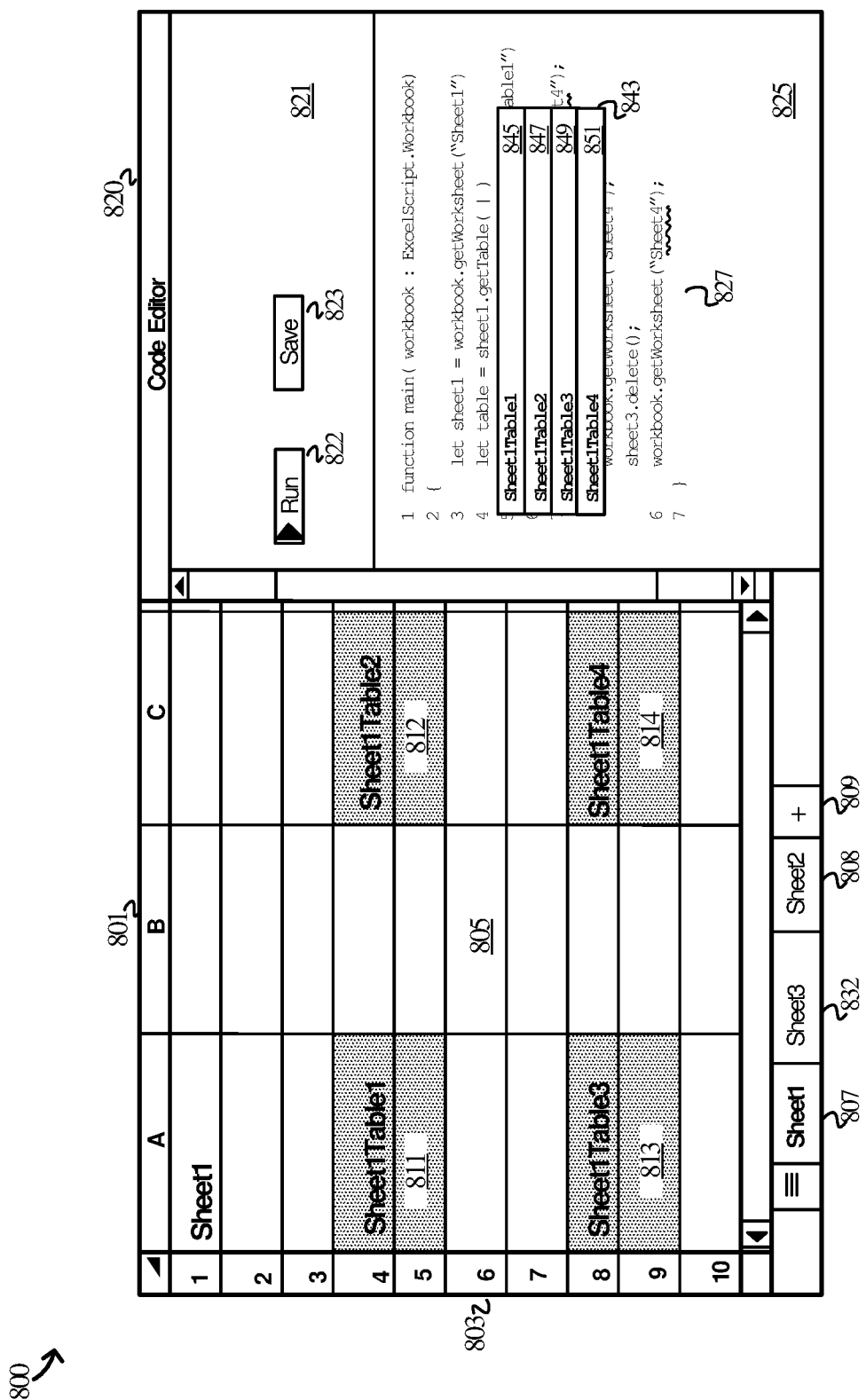

In FIG. 8I, the user has proceeded to correct the error of Sheet4 and line 3 now refers to Sheet1. Accordingly, suggestion box 842 is scoped to only those tables in Sheet1. In addition, at line 4 the scope of the getTable function is Sheet1. Accordingly, suggestion box 843 is limited to only those tables found in Sheet1, as opposed to all three sheets as in FIG. 8H.

Figure 8J:
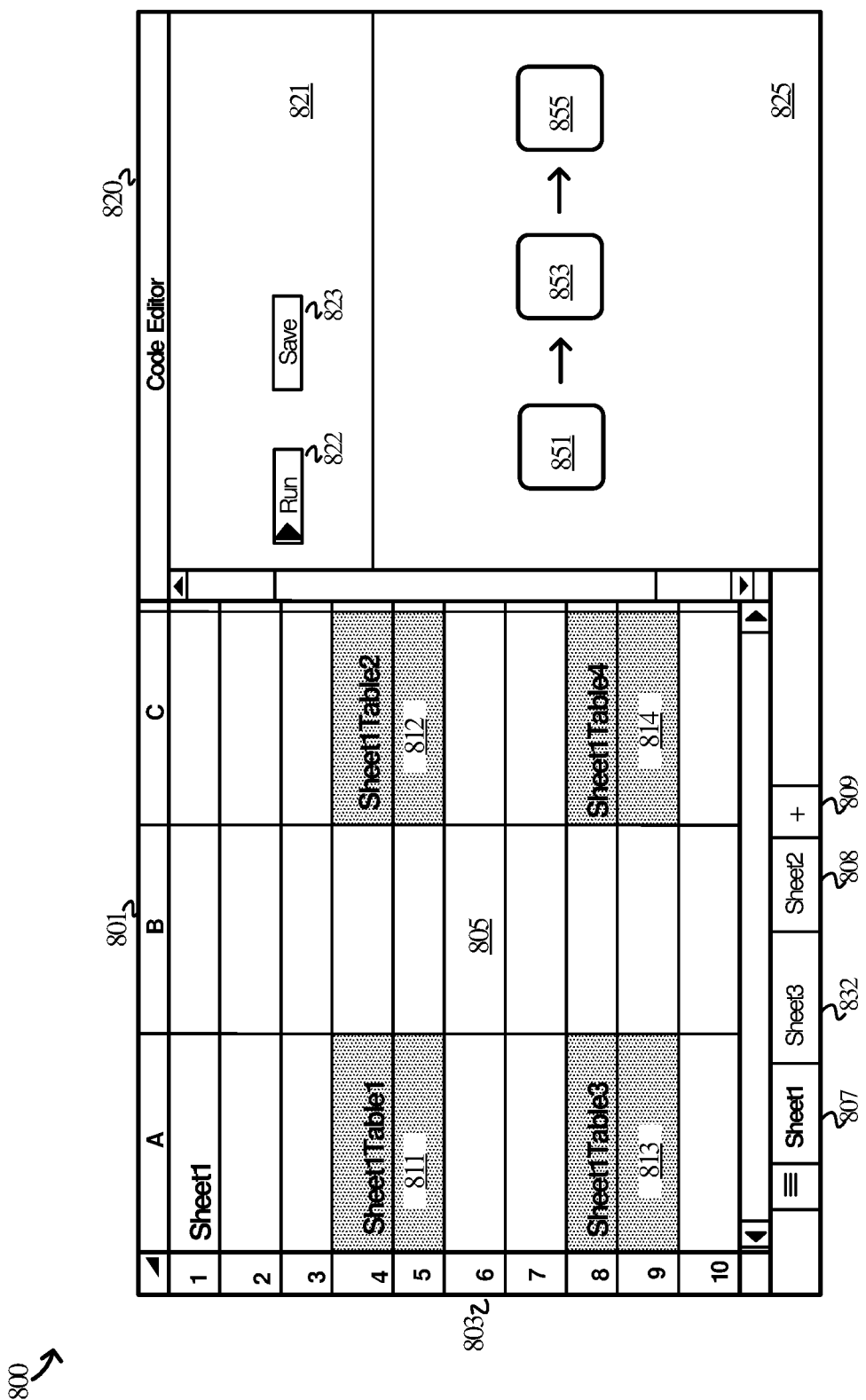

FIG. 8J illustrates an example whereby functional block programming is supported in the code editor. Rather than written code statements on canvas 825, functional code blocks are provided instead, represented by block 851, block 853, and block 855.

It may be appreciated that, while the foregoing implementations refer to linting with respect to written code such as scripts, the concepts apply as well to other coding paradigms such as functional block coding environments (sometimes referred to "no code" environments). In an example, a block editor (as opposed to a code editor) would allow for the creation of scripts by dragging and dropping blocks which would perform the actions. For example, for a block that deletes a table, the block editor would be able to generate a dropdown menu based on existing tables in the workbook from which table is to be deleted. The dropdown can change as the user manually adds and removes tables from the workbook.

Moreover, the functional code blocks can be analyzed by a linting process for errors or problems in view of the dynamically changing environment that is the focus or target of the code blocks. Thus, just as scripts or other such written code might refer to invalid or non-existent elements of a content object, so too might functional-type code blocks. A linter could examine the code blocks in view of a model of their target content object, just as described herein for traditional code statements.

Figure 8K:
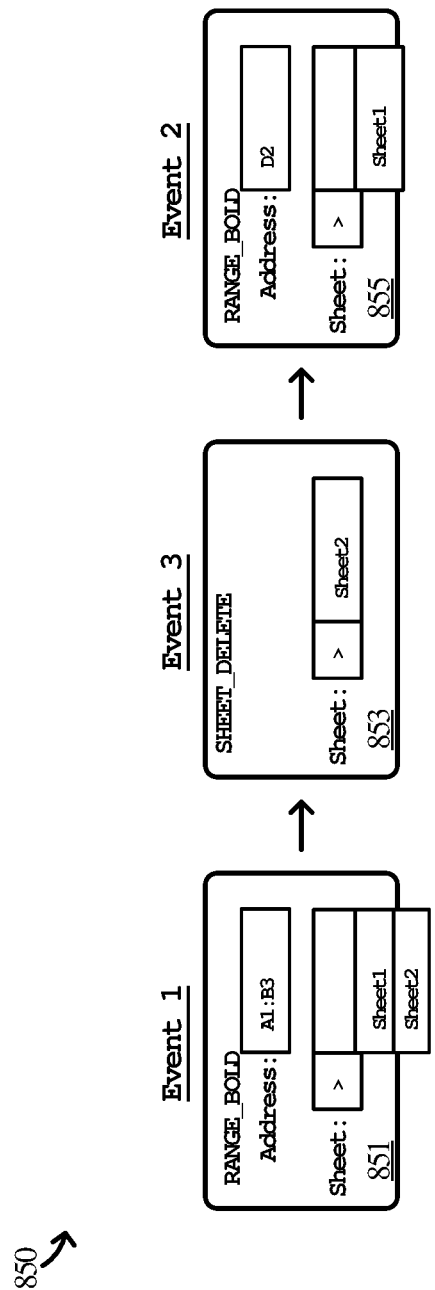

FIG. 8K illustrates a more detailed view 850 of the functional code blocks on canvas 825. Each block performs a specific operation with respect to specific cell ranges and/or worksheets in a workbook. Moreover, the blocks are arranged in the order that they are executed from left to right. For instance, block 851 responds to Event 1 by bolding cells in range A1:B3 in a sheet chosen by the user from a drop-down menu of available sheets. If the user were to manually enter a sheet name that does not yet exist, the linter would flag the reference as invalid and requiring correction.

Block 853 defines a sheet-delete operation where Sheet2 is deleted in response to Event 3 occurring. Thus, in block 855, Sheet2 is no longer presented as an option in the drop-down menu for its bold operation. This is because the linter will have updated the model for the workbook to reflect that implied change with respect to Sheet2—that it would have been deleted by the time Event 2 occurs, since Event 2 is scheduled in the timeline after Event 3.

FIG. 9 illustrates computing device 901 that is representative of any system or collection of systems in which the various processes, programs, services, and scenarios disclosed herein may be implemented. Examples of computing device 901 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 901 may be implemented as a single apparatus, system, or device or may be implemented in a distributed manner as multiple apparatuses, systems, or devices. Computing device 901 includes, but is not limited to, processing system 902, storage system 903, software 905, communication interface system 907, and user interface system 909 (optional). Processing system 902 is operatively coupled with storage system 903, communication interface system 907, and user interface system 909.

Processing system 902 loads and executes software 905 from storage system 903. Software 905 includes and implements linting process 906, which is representative of the linting processes discussed with respect to the preceding Figures, such as linting process 200 and linting process 700. When executed by processing system 902, software 905 directs processing system 902 to operate as described herein for at least the various processes, operational scenarios, and sequences discussed in the foregoing implementations. Computing device 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including linting process 906) may be implemented in program instructions and among other functions may, when executed by processing system 902, direct processing system 902 to operate as described with respect to the various operational scenarios, sequences, and processes illustrated herein. For example, software 905 may include program instructions for implementing enhanced code linting as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing device 901 is representative) overall from a general-purpose computing system into a special-purpose computing system customized to support enhanced code linting. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   one or more processors operatively coupled with the one or more computer readable storage media; and
   program instructions stored on the one or more computer readable storage media that, when executed by the one or more processors, direct the computing apparatus to at least:
   display, in a code editor interface, code statements of a script relating to a content object hosted by an application, wherein the content object comprises a spreadsheet workbook;
   obtain an initial state of the content object from the application, wherein the initial state identifies elements of the spreadsheet workbook;
   generate a model that reflects at least the initial state of the content object;
   perform an analysis of the code statements with respect to the model to identify a change to an element of the spreadsheet workbook implied by a code statement of the code statements;
   update the model to reflect the change to the element implied by the code statement;
   determine, based on the updated model, that the change to the element implied by the code statement will cause an error at a time of execution of the code statement; and
   display an indication of the error in the code editor interface.

2. The computing apparatus of claim 1 wherein, to perform the analysis of the code statements, the program instructions further direct the computing apparatus to at least:
   identify references in the code statements to elements of the content object;
   check the model to determine whether the elements exist in the content object; and
   for at least a one of the elements determined not to exist in the content object, surface an indication of an invalid element in the code editor interface.

3. The computing apparatus of claim 2 wherein the change to the element of the spreadsheet workbook implied by the code statement comprises a deletion of the element from the content object.

4. The computing apparatus of claim 3 wherein to determine that the change to the element of the spreadsheet workbook implied by the code statement will cause an error at the time of execution of the code statement, the program instructions direct the computing apparatus to determine whether the implied change is rectified by a change implied by a second code statement.

5. The computing apparatus of claim 4 wherein the elements of the content object comprise worksheets of the spreadsheet workbook, and tables in the worksheets.

6. The computing apparatus of claim 5 wherein the program instructions comprise one or more components of the code editor.

7. The computing apparatus of claim 6 wherein the code editor comprises a component of the application, wherein the application comprises a spreadsheet application.

8. The computing apparatus of claim 2 wherein the program instructions further direct the computing apparatus to at least:
   obtain, from the application, information indicative of a new state of the content object resulting from actual changes made to the content object by the application; and
   refresh the model to reflect the new state of the content object.

9. The computing apparatus of claim 2 wherein the change to the element of the spreadsheet workbook implied by the code statement comprises an addition of a new element to the content object.

10. The computing apparatus of claim 1 wherein the change to the element implied by the code statement comprises a state change with respect to the content object which occurs at the time of execution of the code statement.

11. One or more computer readable storage media having program instructions stored thereon that, when executed by one or more processors, direct a computing apparatus to at least:
    identify code statements in one or more scripts associated with a content object opened in an application, wherein the content object comprises a spreadsheet workbook;

obtain an initial state of the content object from the application, wherein the initial state identifies elements of the spreadsheet workbook;

generate a model that reflects at least the initial state of the content object;

perform an analysis of the code statements with respect to the model to identify a change to an element of the spreadsheet workbook implied by a code statement of the code statements;

update the model to reflect the change to the element implied by the code statement;

determine, based on the updated model, that the change to the element implied by the code statement will cause an error at a time of execution of the code statement; and display an indication of the error in a user interface to the application.

12. The one or more computer readable storage media of claim 11 wherein, to perform the analysis of the code statements, the program instructions further direct the computing apparatus to at least:

identify references in the code statements to elements of the content object;

check the model to determine whether the elements exist in the content object; and for at least a one of the elements determined not to exist in the content object, surface an indication of an invalid element in the user interface to the application.

13. The one or more computer readable storage media of claim 12 wherein the program instructions further direct the computing apparatus to at least:

obtain, from the application, information indicative of a new state of the content object resulting from actual changes made to the content object by the application; and refresh the model to reflect the new state of the content object.

14. The one or more computer readable storage media of claim 13 wherein the change to the content object implied by the code statements comprises an addition of a new element to the content object.

15. The one or more computer readable storage media of claim 11 wherein the change to the element implied by the code statement comprises a deletion of the element from the content object.

16. The one or more computer readable storage media of claim 11 wherein to determine that the change to the element of the spreadsheet workbook implied by the code statement will cause an error at the time of execution of the code statement, the program instructions direct the computing apparatus to determine whether the change is rectified by a change implied by a second code statement.

17. A method of operating a computing device to analyze computer program code, the method comprising:

the computing device enabling display of, in a user interface to code editor, code statements of a script relating to a content object hosted by an application, wherein the content object comprises a spreadsheet workbook;

the computing device obtaining an initial state of the content object from the application, wherein the initial state identifies elements of the spreadsheet workbook;

the computing device generating a model that reflects at least the initial state of the content object;

the computing device analyzing the code statements with respect to the model to identify a change to an element of the spreadsheet workbook implied by a code statement of the code statements;

the computing device updating the model to reflect the change to the element implied by the code statement;

the computing device determining, based on the updated model, that the change to the element implied by the code statement will cause an error at a time of execution of the code statement; and the computing device enabling display of an indication of the error in the user interface to the code editor.

18. The method of claim 17 wherein, analyzing the code statements further comprises:

identifying references in the code statements to elements of the content object;

checking the model to determine whether the elements exist in the content object; and for at least a one of the elements determined not to exist in the content object, enabling display of an indication of an invalid element in the user interface to the code editor.

19. The method of claim 18 wherein the change to the element implied by the code statement comprises a deletion of the element from the content object.

20. The method of claim 18 wherein the method further comprises:

obtaining, from the application, information indicative of a new state of the content object resulting from actual changes made to the content object by the application; and refreshing the model to reflect the new state of the content object.

* * * * *